(12) United States Patent
Shah

(10) Patent No.: US 7,251,683 B1
(45) Date of Patent: Jul. 31, 2007

(54) INFORMATION HANDLING SYSTEM INCLUDING ARRANGEMENTS FOR INITIATING AN APPLICATION IN RESPONSE TO USAGE OF CROSS REFERENCE BETWEEN INFORMATION AND FOR INITIATING USAGE OF A WORKFLOW FLOW CHART ASSOCIATED WITH AND INFORMATION WORK

(75) Inventor: Sandeep Shah, 25 Castle Rd., Northboro, MA (US) 01532

(73) Assignee: Sandeep Shah, Northboro, MA (US)

( * ) Notice: Subject to any disclaimer, the term of this patent is extended or adjusted under 35 U.S.C. 154(b) by 0 days.

(21) Appl. No.: 10/281,296

(22) Filed: Oct. 25, 2002

(51) Int. Cl.
*G06F 15/16* (2006.01)

(52) U.S. Cl. .................. 709/217; 709/218; 709/219

(58) Field of Classification Search .............. 709/217, 709/218, 219; 707/100; 717/101
See application file for complete search history.

(56) References Cited

U.S. PATENT DOCUMENTS

| | | | | | |
|---|---|---|---|---|---|
| 4,270,182 | A | * | 5/1981 | Asija | 704/8 |
| 6,064,814 | A | * | 5/2000 | Capriles et al. | 717/116 |
| 6,463,439 | B1 | * | 10/2002 | Dahlberg | 707/100 |
| 2002/0065842 | A1 | * | 5/2002 | Takagi et al. | 707/500 |
| 2003/0101083 | A1 | * | 5/2003 | Venkatesh et al. | 705/8 |

* cited by examiner

*Primary Examiner*—Krisna Lim

(57) ABSTRACT

An information handling system is disclosed including a plurality of information works, at least one application, and a reverse cross-reference control subsystem. Each information work includes information, and cross-references can be between information in the respective information work. The reverse cross-reference control subsystem, in response to a user initiating use of a cross-reference, determines whether the cross-reference is associated with the at least one application, and, if so, initiates processing the application. The system, in another aspect, includes a workflow flow chart associated with an information work and a control module that initiate usage by a user of the associated workflow flow chart in response to a request therefor from the user while the user is utilizing the respective information work.

15 Claims, 4 Drawing Sheets

INFORMATION HANDLING SYSTEM INCLUDING ARRANGEMENTS FOR INITIATING AN APPLICATION IN RESPONSE TO USAGE OF CROSS REFERENCE BETWEEN INFORMATION AND FOR INITIATING USAGE OF A WORKFLOW FLOW CHART ASSOCIATED WITH AND INFORMATION WORK

INCORPORATION BY REFERENCE

U.S. Pat. No. 6,389,461, issued May 14, 2002, in the name of Sandeep Shah and entitled "System And Method For Supplying And Updating Information From One Or More Works To One Or More Remote User Devices In A Readily Accessible Form, And Remote User Device For Use Therein" (hereinafter referred to as the Shah patent), incorporated by reference.

FIELD OF THE INVENTION

The invention relates generally to the field of systems and methods for providing information from one or more works to one or more remote locations in a form that is readily accessible.

BACKGROUND OF THE INVENTION

Complex information is used in a number of fields. Heretofore, such information has been provided printed in book form. This can result in a number of problems, particular when a user may wish to access information in a number of books concurrently. Typically, each work is indexing separately, and cross-referencing as among a number of works can typically be difficult, particularly when one needs to use information on-site. In addition, it is often difficult to ensure that the information is satisfactorily maintained in updated form Although information from individual works can often be accessed in electronic form, such as through a personal computer or laptop computer, typically such a computer are difficult to carry and use, and are also relatively expensive. In addition, although updating information as maintained on a computer may be easier than if the information is simply maintained in book (printed) form, such updates typically require a network administrator to ensure that the information has been provided to a particular computer in a timely basis.

The Shah patent describes an information supply and update system by which information in structured form can be disseminated from a central base subsystem to a number of remote user devices such as PDA's (personal digital assistants), paging devices, cellular telephones, smart phones, and/or any other types of devices which may receive information from a remote location and store the information for later display. The information supplied by the information supply and update system is structured, that is, it can include information from a number of works, with various works including a plurality of topics, each including a plurality of sections. The topics and sections, along with indices set up for the various works, allow a user to easily navigate through the respective works, and cross-references allow a user, when he or she is in one work, to find related information in another work.

SUMMARY OF THE INVENTION

The invention provides a new and improved information supply and update system.

In brief summary, in one aspect the invention provides an information handling system comprising a plurality of information works, at least one application, and a reverse cross-reference control subsystem. At least one of the information works includes information and a work control module configured to facilitate accessing the information. At least one other information work includes at least information, and the work control module being further configured to establish at least one cross-reference between the at least one information work and the other information work. The reverse cross-reference control subsystem is configured to, in response to a user initiating use of the at least one cross-reference, determine whether the at least one cross-reference is associated with the at least one application, and, if so, initiate processing of the at least one application.

In another aspect, the invention provides an information handling system comprising at least one workflow flow chart, at least one information work associated with the at least one workflow flow chart and a control module configured to initiate usage by a user of the workflow flow chart in response to a request therefor from the user while the user is utilizing the at least one information work.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
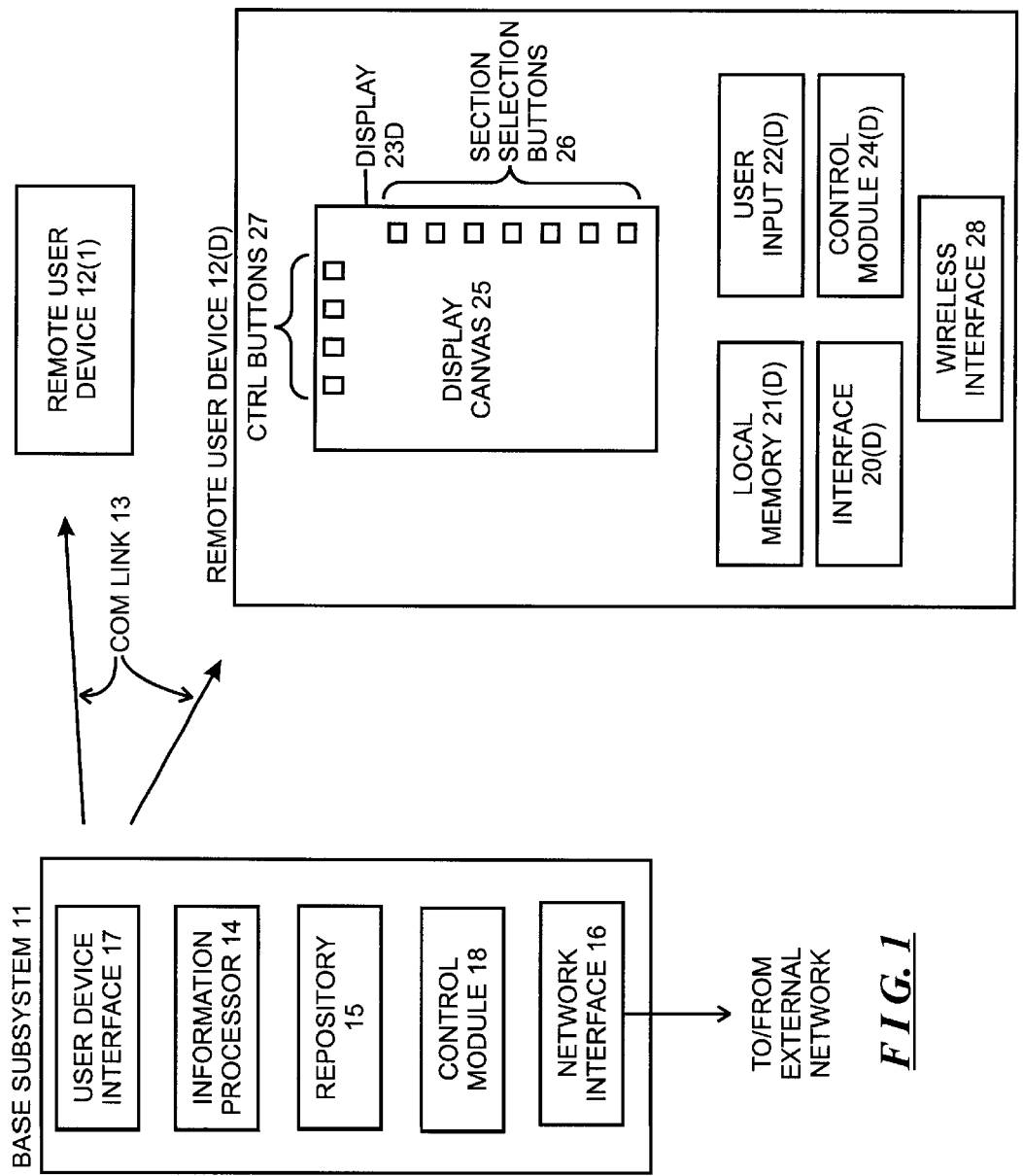
FIG. 1 schematically depicts an information supply and update system, constructed in accordance with the invention.

FIG. 1 depicts an information supply and update system 10 for, inter alia, supplying information to a user and updating the information as necessary, constructed in accordance with the invention. With reference to FIG. 1, the information supply and update system 10 includes a base subsystem 11 and one or more remote user devices 12(1) through 12(D) (generally identified by reference numeral 12(d)). The base subsystem 11 generally includes an information processor 14, an information repository 15, an external network connection 16, and a user device interface 17, all of which operate under control of a control module 18. The information processor 14 processes information from information sources to identify individual information items which may be displayed on a display of a respective remote user device 12(d), extracts table of contents and index information therefor, and compresses the individual information items and provides them through the user device interface 17 and over communication link 13 to the respective remote user devices 12(*d*). In addition, the information processor 14 can generate cross-references both within and between information items and provide them through the user device interface 17 and over communication link 13 to the respective remote user devices 12(*d*). All of the remote user devices 12(*d*) may receive the same information, or, alternatively, entities who maintain respective ones of the remote user devices 12(*d*) may subscribe to respective ones of the information sources and, in that case, the base subsystem 11 may provide the remote user devices 12(*d*) with only information from the subscribed sources. The information may be provided over any form of a communication link, generally identified by reference numeral 13, which may comprise a wire, optical fiber connection, a wireless connection, or combination thereof, or any other arrangement by which information may be transferred between the base subsystem 11 and remote user devices 12(*d*).

In one embodiment, the remote user devices 12(*d*) are devices such as PDA's (personal digital assistants), paging devices, cellular telephones, smart phones, and/or any other types of devices which may receive information from a remote location, such as the base subsystem 11, and store the information for later display. Preferably, the remote user devices 12(*d*) Generally, in that embodiment, a remote user device 12(*d*) includes a link interface 20(*d*), a local memory 21(*d*), a display 22(*d*), and a user input 23(*d*), all operating under control of a control module 24(*d*). The link interface 20(*d*) allows the remote user device 12(*d*) to communicate with the base subsystem 11, receive information therefrom and provide information thereto, as described in the aforementioned Shah patent. The link interface 20(*d*) generally stores the information received from the base subsystem 11 in the local memory 21(*d*) for later retrieval and display, and may also provide the information to the display 23(*d*) for display. The user input 23(*d*) allows a user to provide user input, which may, for example, identify particular items of information which have been stored in the local store that are to be displayed. In that case, the control module 24(*d*) will enable the information to be retrieved and displayed on the display 23(*d*). The user input may be in the form of a keypad, a microphone, a touch screen, or other appropriate forms for receiving input from a user, or any combination of these.

In addition, in one embodiment, the information from each information source is generally in a structured format, with each information work that may be provided by an information source including a plurality of topics, each related to a particular topic, with each topic having a plurality of sections. An information source may provide a single work, or a plurality of works. In that embodiment, all topics generally have sections directed to topics from a set of sections that are associated with the work, although not all topics need have all of the sections from the set of sections. An information work may, for example, comprise database table, with the various topics comprising individual records; in that case, the sections may comprise respective fields of the various records in the table. It will be appreciated that different information works can have different structures. When a remote user device 12(*d*) displays the information from a section of a topic in the display canvas 25 of the display 22(*d*), a set of section selection buttons 26 are provided along the right side of the display canvas 25, and a set of control buttons 27 are provided along the top side of the display canvas. In one embodiment, the display 22(*d*) is in the form of a touch screen, which can both display information and sense when a user touches the screen with, for example, a pointing device; in that case, if the user touches the screen with a pointing device at a button 26 or 27, thereby "actuating" the button, he or she can enable the remote user device 12(*d*) to perform an operation. For example, if the user actuates a appropriate one of control buttons 27, he or she can enable the remote user device 12(*d*) to perform any of a number of operations described herein, including, for example, displaying information, enabling information to be updated and annotated, enabling the index or a cross-reference associated with the information work, topic or section to be displayed, and the like Each selection button 26 is associated with one of the sections, and a user can enable the remote user device to scroll to a particular section by clicking on or otherwise selecting the one of the section buttons 26 that is associated with the respective section. The series of section buttons may be identified by, for example, alphanumeric characters from a series, such as "A," "B," "C," . . . or "1," "2," "3," . . . , a mnemonic device such as the first letter of the section heading with which it is associated, such as, for example, "B," "U," "F," "G," . . . if the section headings are "Brand Name," "Use," "Forms" and "General." Since different information sources may have topics that contain different numbers of topics, the number of section buttons 26 that are provided may differ as among the different information sources.

As noted above, the information supply and update system 10 can enable the information provided to the remote user devices to be updated. This may be desirable if, for example, one or more topics of an information work is updated. In that case, the base subsystem 11, at the request of a remote user device, can transmit updated information, which may also include or comprise an updated index, to the remote user device 12(*d*). When a remote user device 12(*d*) receives the updated information, it can store it in its local memory 21(*d*) in place of the previous version of the information. Each topic provided to a remote user device 12(*d*) is associated with a respective version identifier, which the remote user device 12(*d*) also receives and stores with the respective topic. The remote user device 12(*d*) can periodically communicate with the base subsystem 11 to determine whether the base subsystem 11 has updated information that should be provided to the remote user device 12(*d*), and, if so, transmit the updated information to the remote user device 12(*d*).

In that operation, the base subsystem can transmit, for respective topics for which it has updated information, an identifier for the topic and the associated version identifier, to the remote user device 12(*d*). The remote user device 12(*d*), in turn, can compare the version identifiers to the version identifiers for the respective topics which it has previously received. If the remote user device 12(*d*) determines that the version identifier for a topic that it has received from a base subsystem 11 indicates that the base subsystem 11 has a later version than the version that it has stored in its local memory 22, the remote user device 12(*d*) can request that the later version be transmitted thereto. After the remote user device 12(*d*), and specifically the link interface 20(*d*), has received the updated information from the base subsystem 11, it can store the information in the local memory 21(*d*).

In one embodiment, the user can provide preferences information to specify which topics are to be checked for updates and how often the topics are to be updated. The preferences information can be provided to the remote user device 12(*d*), to the base subsystem 11, or to any other information management device. If, for example, the preferences information is provided to the remote user device 12(d), the remote user device 12(d) can check for updates for the various topics at times as indicated by the preferences information. On the other hand, if the preferences information is provided to the base subsystem 11 or to another information management device, that, device can download the updates to the remote user device 12(d) at times as indicated by the preferences information. In addition or alternatively, a user may manually enable his or her remote user device 12(d) to check for updates of specified topics or all topics.

In addition to displaying information provided by the base subsystem 11, a user, using one of the remote user devices 12(d), can input information that will be transmitted to the base subsystem for storage in a repository 15 for later access by that remote user device 12(d) and/or by other remote user devices. In one embodiment, the information supply and update system 10 is used in connection with health care institutions, with the information sources comprising sources describing, for example, diseases, pharmaceutical products, and generally including information sources that may be helpful in diagnosing diseases and identifying possible remedies therefor. In addition, a remote user device 12(d) can receive and store patient information for a physician's patients, including, for each patient, the identifications of diagnoses that the physician has made for the patient and the identifications of pharmaceutical products that the physician has prescribed for the patient. In that embodiment, the user can enter the patient information through the user input 22(d), and, after entry, the patient information will be stored in the local memory 21(d). Thereafter, the remote user device 12(d) can transfer a copy of some or all of the patient information to the base subsystem 11 for storage in the repository 15. After the patient information has been transferred to the base subsystem 11, it may be retrieved by the same physician, or another physician who has been authorized to access the patent information. In either case, the patient information can be accessed using the same or another remote user device 12(d); in that case, the base subsystem 11 can transfer the patient information to the remote user device 12(d) through, for example, the user device interface 17. In addition, for pharmaceutical product prescriptions which have been transferred to the base subsystem 11, the base subsystem 11 can transmit over a network (not separately shown) through, for example, the network interface 16, the prescription to a pharmacy where it can be filled. In addition, some or all of the patient information can be forwarded over the network to a third party payer such as an insurance company, health maintenance organization, preferred provider organization, or the like, for billing purposes.

In addition to transmitting the prescription and patient information to the repository 15, the remote user device 12(d) can enable the information to be printed locally. Similarly, the remote user device 12(d) can enable that has been information received from the base subsystem 11 to be printed locally. As noted above, the remote user devices 12(d) are in the form of PDA's, paging devices, cellular telephones, smart phones, and so forth, and will preferably be provided with infrared or other wireless interface 28. If the wireless interface 28 is held in appropriate proximity to an appropriate interface on, for example, a printer (not shown), the remote user device 12(d) can transmit information to the printer, which, in turn can print the information in hardcopy form. In addition, for those remote user devices 12(d) in which the interface 20(d) provide connections to the public switched telephony network (PSTN), such as cellular telephones, or to a network such as the Internet, to wireless networks, and the like such information an be transmitted by facsimile, Email or otherwise to another location. It will be appreciated that the information to be printed, facsimileed, Emailed or otherwise transferred to another location may comprise an entire topic or portions thereof as selected by the user. In one embodiment, the prescription information that is printed, facsimileed, Emailed, etc., includes a bar code that can be read by a bar code reader at, for example, a pharmacy, with the data being stored on, for example, a computer. This can ensure that the prescription information is accurately stored on the computer, eliminate the necessity of entering the prescription information by hand, and perhaps help in automating the prescription filling process.

As noted above, the base subsystem 11 includes a network interface 16 for connecting it (that is, the base subsystem 11) to a network. The network can be any network such as the Internet, public switched telephony network (PSTN), or the like. The network may be used, as described above, to enable the base subsystem 11 to transfer prescription information to pharmacies and patient information to third party payers. In addition, the network may be used to enable the base subsystem to access information from sources (not separately shown) that are available over the network, sources on the World Wide Web, or other information sources that will be apparent to those skilled in the art. The base subsystem 11 can, through the network interface 16, search information sources available on the network for use in its operations. For example, the base subsystem 11, and, in particular, the information processor 14, can retrieve the information that is to be processed and distributed to the remote user devices 12(d) from the various publishers of the information over the network through the network interface 16.

In addition, the base subsystem 11 can, automatically and/or at a user's request, perform a search to locate and retrieve information relating to particular subjects, and provide the located information to the user's remote user device 12(d). Illustrative topics for searching may include, for example, a information relating to diagnoses which have been developed for a user's patients, pharmaceutical products that have been recently prescribed to a user's patients, or information on any other topics that a user may deem desirable to have. The user, using his or her remote user device 12(d), can enter indicia through the user input 22(d) which is transferred to the base subsystem 11 identifying the topic or topics to be searched. Alternatively or in addition, the user can, using, for example, his or her remote user device 12(d), establish preferences with either the remote user device 12(d), the base subsystem 11, or both, to enable the base subsystem 11 to perform searches in connection with, for example, patient information that has been recently entered into the user's remote user device 12(d), uploaded thereby and/or by other remote user devices 12(d) to the base subsystem 11, and the like.

As noted above, the user can use the control buttons 27 to enable the index or a cross-reference associated with the information work, topic or section to be displayed. As further noted above, the base subsystem 11 generates the index and cross-reference information. Illustrative methodologies for generating the index and cross-reference information are described in the aforementioned Shah patent. In addition, a user, while using his or her remote user device 12(d), can also generate his or her own cross-reference information to cross reference a particular work, topic and/or section, which will be referred to as a "cross-reference source," to another topic or section in the same work or in a different work, which will be referred to as a "cross-reference target." If the user actuates a respective control button 27 while a section of a particular topic and work is being displayed, a list of cross-references associated therewith will be displayed, which list includes both the cross-reference targets (if any) that were provided by the base subsystem 11 and the cross-reference targets (if any) that were provided by the user. If the user actuates one of the cross-references in the list, the remote user device 12(d) will display the information associated with the cross-reference target in the display canvas.

In accordance with one aspect of the invention, when a user generates a cross-reference, the remote user device 12(d), in addition to entering the information regarding the cross-reference into a cross-reference table for the cross-reference source for use in allowing the linking the cross-reference source to the cross-reference destination the remote user device 12(d) will also store information regarding the cross-reference, including the identifications for both the cross-reference target and the cross-reference source as well as certain context information, in a separate cross-reference registry. The remote user device 12(d) can use the information in the cross-reference registry for any of a number of purposes. For example, a program that is executed by the remote user device 12(d) can monitor cross-reference usage, both of the cross-reference sources and the cross-reference targets, and enable the remote user device 12(d) to contact the base subsystem 11 to notify it of the usage. The base station 11, in turn try to locate various types of information related to the cross-reference usage. Illustrative types of information include, for example, recently-published papers, abstracts related to the cross-referenced topics, advertisements for products or services related to the cross-referenced topics, and the like. In the illustrative arrangement, in which the information supply and update system 10 is used in a medical application, the information may also include, for example, information as to pharmaceuticals and other products that have been recently-approved by the U. S. Food and Drug Administration. If the base subsystem 11 locates such information, it can download the information to the remote user device 12(d), which can so notify the user.

As another example, a program that is executed by the remote user device 12(d) can monitor cross-reference usage can enable the remote user device 12(d) to, in turn, enable the user to communicate with other individuals who may be, for example, experts in the field or fields related to the cross-referenced topics, knowledgeable about products or services related to the cross-referenced topics, or who have some particular expertise regarding the cross-referenced topics. The remote user device 12(d) may do this automatically, or it may notify the user of another appropriate individual who he or she may contact, and the user may initiate the communication. If the remote user device 12(d) is capable of voice transmission and reception, the user may initiate a voice communication over, for example the PSTN. On the other hand, if the remote user device 12(d) is capable of communication using text, the user may initiate, for example, communication using electronic mail ("Email") or any of a number of "instant messaging" techniques. Other types of communication that the remote user device 12(d) may enable the user to engage in will be appreciated by those skilled in the art. The remote user device 12(d) may obtain information as to individuals with whom the user may wish to communicate from the base subsystem 11.

Other things for which programs may find the cross-reference information useful will be apparent to those skilled in the art.

Figure 2:
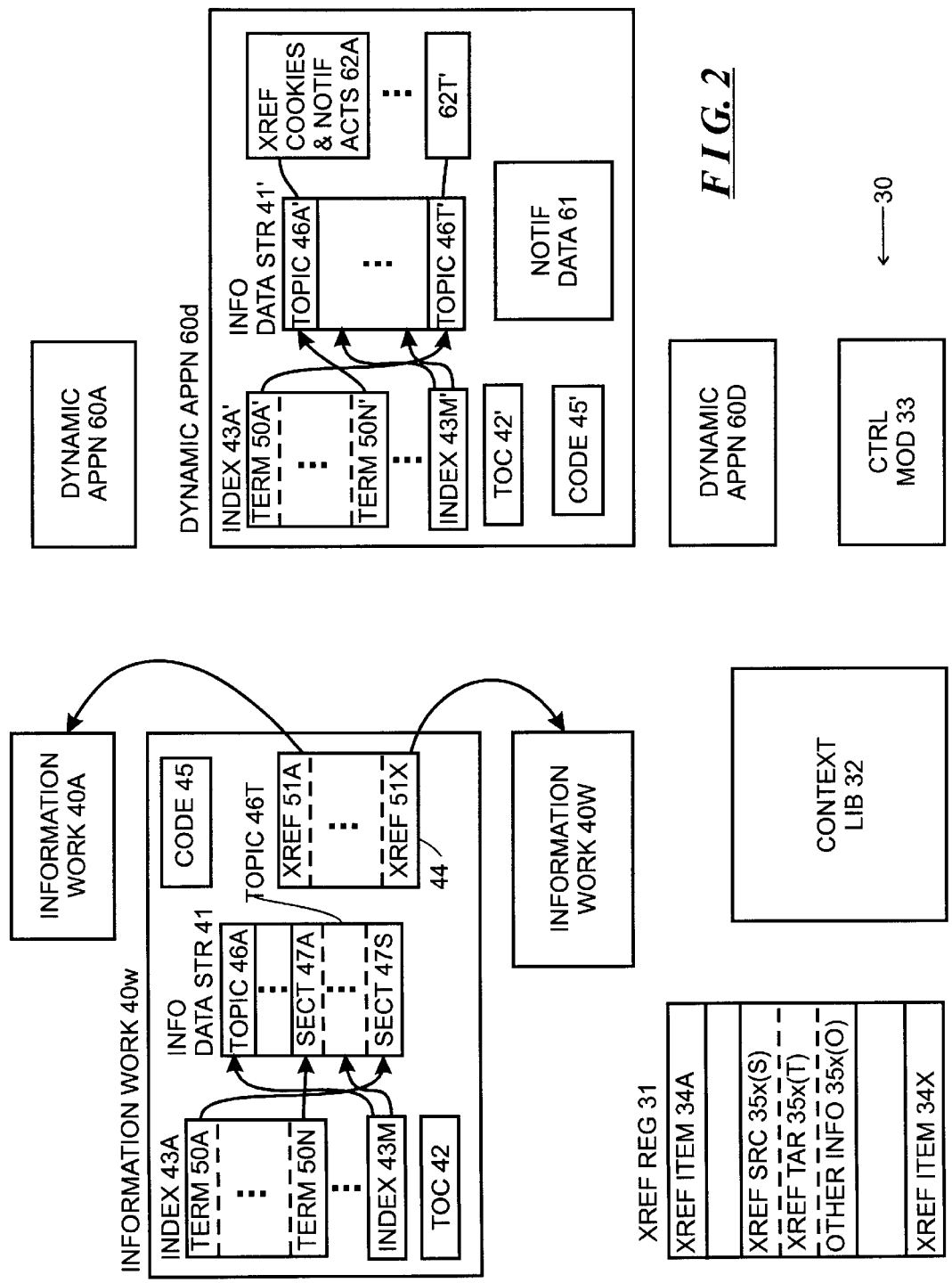
FIG. 2 is a functional block diagram of a portion of the information supply and update system depicted in FIG. 1 for providing a reverse cross-reference subsystem for monitoring cross-reference usage and launching applications based on usage from both cross-reference sources and cross-reference targets, in accordance with one aspect of the invention.

FIG. 2 depicts a functional block diagram of a portion of the remote user device that implements this aspect of the invention, which will be referred to as a "reverse cross-reference subsystem." With reference to FIG. 2 the reverse cross-reference subsystem 30 makes use of a cross-reference registry 31, a context library 32 and a control module 33, in addition to the information works 40A through 40W (generally identified by reference numeral 40w) and the applications that make use of the reverse cross-reference information, which will be referred to as "dynamic applications" 60A through 60D (generally identified by reference numeral 60d). Generally, each information work 40w includes, in addition to an information data store 41 for storing the actual data for the information work, a table of contents 42, one or more indices 43A through 43M (generally identified by reference numeral 43m), one or more cross-reference tables 44 and program code 45. The information data store 41 is arranged in a plurality of topics 46A through 46T (generally identified by reference numeral 46t), with each topic including a number of sections 47A through 47S (generally identified by reference numeral 47s). The user can select a topic 46t or section 47s for display by the remote user device 12(d) in the display canvas 25. The selection can be made in any of a number of ways, including through the table of contents 42, the indices 43m and through the cross-reference tables 44, as will be described below. In addition, the user can navigate through the sections 47s that are associated with a topic using the section selection buttons 26 as described above in connection with FIG. 1.

The table of contents 42 contains information as to the topics 46t and sections 47s in the information work at any degree of granularity. The table of contents 42 may, for example, list an identifier for each topic 46t as well as the location of the first section in the information data store 41. If the topics are organized by subject matter, a identifier for the respective subject matter may also be provided in the table of contents 42, along with the location of the first topic associated with that subject matter in the information data store 41. The table of contents 42 may also include, for each topic, identifications for the various sections and their locations in the information data store 41; however, it will be appreciated that, since sections within the information work will generally be the same from topic to topic, the table of contents 42 may not include the section information. The remote user device 12(d) may display the table of contents 42 in the display canvas 25 in response to the user actuating a control button 27. After the remote user device 12(d) displays the table of contents 42, the user can select a topic 46t or section 47s for display. If the user selects a particular topic 46t or section 47s, the remote user device 12(d) can then display the selected topic 46t or section 47s, using the location information in the table of contents 42 to locate the selected topic 46t or section 47s in the information data store 41.

As noted above, the information work 40w includes one or more indices 43m. One or more of the indices 43m may be provided by the base station 11, and may be generated in a manner described in the Shah patent. Others of the indices 43m may be created by the remote user device 12(d) in response to input provided by the user through the user input 22(d). Each index includes one or more entries 50A through 50N (generally identified by reference numeral 50n) each of which has an index term and location information indicating the location(s) in the information data store 41 of information associated with the index term, possibly along with the identification(s) of the topic(s) 46t and section(s) 47s that contain the respective location(s). The information may be the index term itself or information that is related to the index term, illustratively related by subject matter. In a manner similar to that described above in connection with the table of contents 42, the remote user device 12(d) may display one or more of the indices in response to the user actuating a control button 27. The remote user device 12(d) can display the index terms from the index or indices in any order; conveniently, the remote user device 12(d) can display the index terms in alphabetical order. If the remote user device 12(d) displays a plurality of indices, it can display them as an aggregate index in which index terms from the indices may, for example, be interleaved according to the order in which the remote user device is to display index terms. After the remote user device 12(d), displays an index, the user can select an index term from among those displayed, and a location associated therewith, after which the remote user device 12(d) can display the topic 46t or section 47s at that location.

As also noted above, the information work 40w also includes one or more cross-reference tables 44. Each cross-reference table 44 may be associated with the information work as a whole, with one of the topics 46t, or with a section 47s within a topic 46t. It will be appreciated that a topic 46 or section 47s need not be associated with a cross-reference table 44. A cross-reference table 44 may be provided to the remote user device 12(d) by the base station 11. Alternatively, a cross-reference table 44 may be created for a particular topic 46t or section 47s when the user wishes to create a cross-reference between the respective topic 46t or section 47s and another topic or section in either the same or another information work 40w, if no cross-reference table exists therefor. Each cross-reference table 44 includes one or more entries 51A through 51X (generally identified by reference numeral 51x), each of which stores an identifier for the cross-reference, such as the identification of the information work 40w, topic 46t and/or section 47s that is the target for the cross-reference, as well as location information indicating the location of the topic 46t and/or section in the information data store 41 for the respective information work 40w. When the remote user device 12(d) is displaying a topic 46t or section 47s, the user can actuate a control button 27 to enable the remote user device 12(d) to display a list of cross-reference targets that are associated with the particular topic 46t or section 47t that is currently being displayed in the display canvas 25, if such a cross-reference table exists therefor. After the remote user device 12(d) has displayed the list, the user can select a cross-reference target, after which the remote user device 12(d) can display information from the topic 46t and/or section thereof 47s that is pointed to by the location information associated with the cross-reference target in the cross-reference table 44.

The remote user device 12(d) can make use of the program code 47 associated with an information work 40w to control the operations described above, as well as other operations as described in the Shah patent.

The dynamic applications 60d can have any structure or organization. One illustrative dynamic application 60d is similar to the information works 40w described above, and thus can operate as an information work. Illustratively, the dynamic application 60d includes an information data store 41', a table of contents 42', an index 43m', one or more cross-reference tables 44' and code 45'. In addition, the illustrative dynamic application contains a notification information store 61 for storing notification information for the dynamic application as a whole, as well as a plurality of cross-reference action stores, generally identified by reference numeral 62t', for storing information identifying certain actions to be performed by the dynamic application 60d when the dynamic application 60d receives a notification from the reverse cross-reference subsystem 30 relating to usage of a particular cross-reference. The notification information store 61 specifically stores information as to the types of cross-references usage of which the dynamic application 60d wishes to be notified. The dynamic application 60d, when it is installed from the base subsystem 12 or otherwise initialized, will register with the reverse cross-reference subsystem 30, and use the notification information stored in the notification information store 61 to notify the reverse cross-reference subsystem 30 of the types of cross-references usage of which it is to be notified. After the dynamic application 60d receives such a notification from the reverse cross-reference subsystem 30, including information as to the type of cross-reference that gave rise to the notification, the dynamic application 60d will also use the information in the notification information store 61 to identify ones of the action stores 62t' that contain action information that is to be used by the dynamic application 60d after it has received the notification.

As noted above, the reverse cross-reference subsystem 30 makes use of a cross-reference registry 31, a context library 32 and a control module 33. The cross-reference registry 31 includes a number of entries 34A through 34X (generally identified by reference numeral 34x) each of which stores cross-reference source and target information for a cross-reference that is created for an information work 40w, and, perhaps additional information that may be useful for the reverse cross-reference subsystem 30. Each entry 34x in the reverse cross-reference registry 31 includes a cross-reference source field 35x(S), a cross-reference target field 35x(T) and, if additional information is also stored in the respective entry 34x, an "other information" field 35x(O). The cross-reference source field 35x(s) receives an identifier for the source for the cross-reference that is associated with the entry 34x, and the cross-reference target field 35x(T) receives an identifier for the target for the cross-reference that is associated with the entry 34x. The "other information" field 35x(O), if it exists, receives other information that may be useful for the reverse cross-reference system 30, as noted above. The control module 33 can create the respective entries in the cross-reference registry 31 and store the information in the various fields thereof. The control module 33 can create an entry 34x under any of a number of circumstances. For example, the control module 33 can create an entry 34x when a user creates a cross-reference as described above, and provide the cross-reference source and target information as provided by the user. Alternatively, or in addition, the control module 33 can monitor usage of cross-references, which may include cross-references that the base station 11 and/or remote user device 12(d) may provide, and create an entry 34x after the user has used a particular cross-reference a selected number of times, a selected number of times within a particular time period, or using other criteria as will be appreciated by those skilled in the art.

The context library 32 stores a number of types of information that relate to the contexts associated with the various cross-references information for which is stored in the cross-reference registry 31, including, for example, the information work 40w for which a cross-reference is referenced in the cross-reference registry 31, as well as the dynamic application or applications 60d that have indicated that they are to be notified if the user makes use of a cross-reference for which an entry is present in the cross-reference registry 31. The control module 33 also can store the context information in the cross-reference registry 31. The control module 33 can store context information that is associated with entries 34x in the cross-reference registry 31 when it establishes the respective entries therein. In addition, the control module 33 can store context information associated with respective ones of the dynamic applications 60d when the dynamic applications 60d are initialized, when the control module 33 creates an entry 34x in the cross-reference registry 31, or at other times as will be appreciated by those skilled in the art. As an example, if a dynamic application 60d provides a particular service in connection with particular types of cross-referenced information, when the control module 33 creates an entry 34x for a cross-reference for one of those types of information in the cross-reference registry 31, it can also store information in the context library 32 associating the dynamic application 60d with that entry 34x.

The control module 33 operates to control the reverse cross-reference system 30, and in those operations generally performs two general types of operations. First, the control module 33 operates to create entries 34x in the cross-reference registry 31 and store cross-reference and other information in the respective entries 34x and the context library 32, as described above, as cross-references are created by the respective information works 40w and as dynamic applications 60 are initialized. As noted above, the control module 33 can create entries 34x in the cross-reference registry 31 using any of a number of criteria, including creation of a cross-reference by a user, cross-reference usage by the user, or any other criteria or any combination of criteria. As dynamic applications 60d are loaded and initialized, the control module 33 can also store information regarding the dynamic applications and particularly the entries 34x associated with cross-references for which the respective dynamic application 60d is to receive notifications when used by a user.

In addition to loading information into the cross-reference registry 31 and context library 32 as appropriate, the control module 33 also monitors cross-reference usage by the user and provides notifications to the dynamic applications 60d as appropriate. For example, if a dynamic application 60d is to receive a notification after a user has used a particular cross-reference or members of a group of cross-references, the control module 33 can, after a user makes use of a cross-reference, determine whether the cross-reference has been used the requisite number of times, and, if so, provide a notification to the respective dynamic application 60d. The control module 33 can provide notifications to respective ones of the dynamic applications 60d in a similar manner. As noted above, the dynamic applications 60d register with the reverse cross-reference subsystem 30, and in that operation, they provide a notification to the control module 33 as to the types of cross-references for which they wish to be called, which information they obtain from their respective notification information stores 61. The control module 33 receives this information from the respective dynamic applications and uses it to store information in the context library 32 indicating the types of cross-references for which the respective dynamic applications are to be notified.

Figure 3:
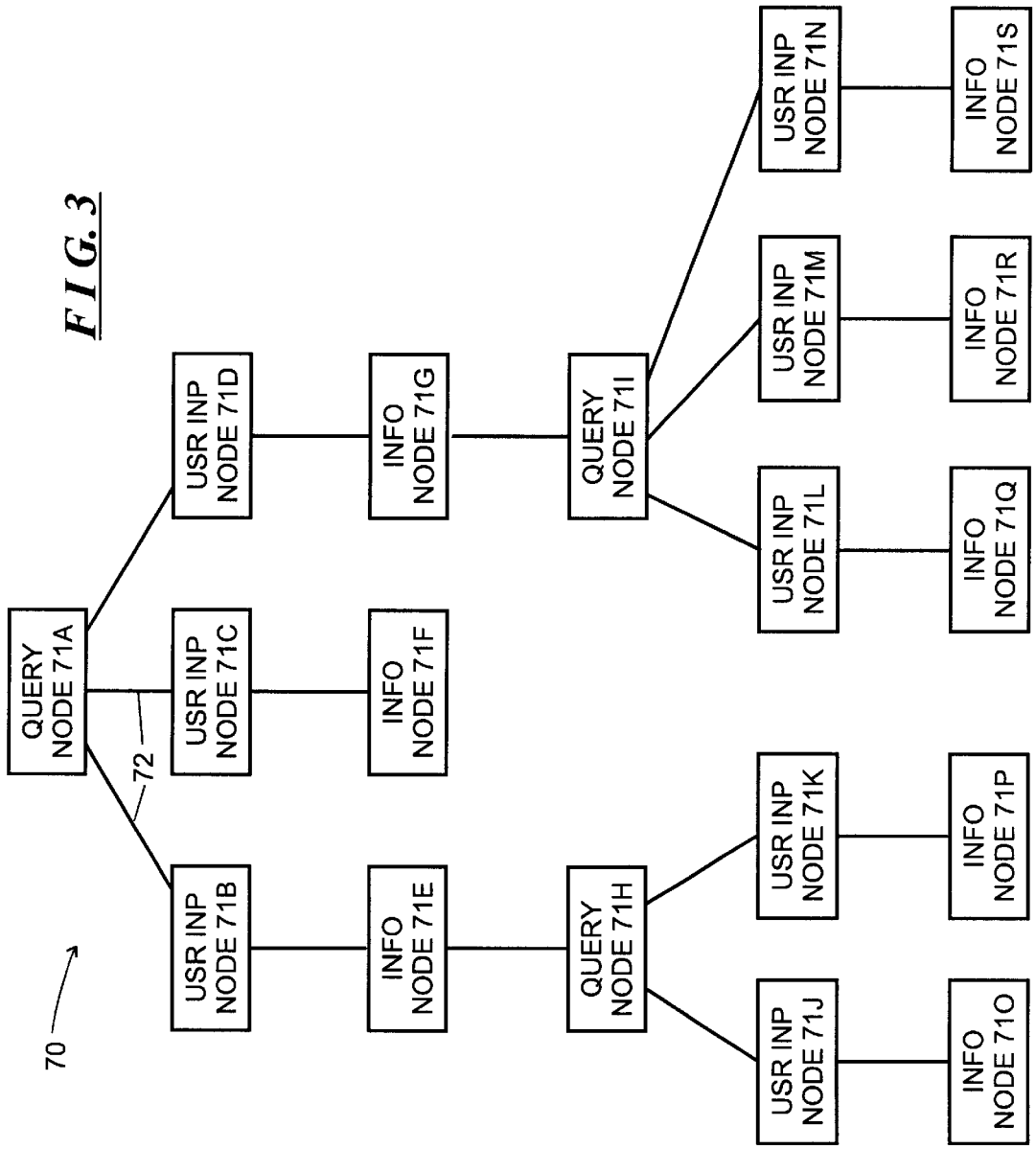
FIG. 3 depicts an illustrative workflow flow chart, useful in understanding a workflow flow chart subsystem.

A second aspect of the invention will be described in connection with FIG. 3. With reference to FIG. 3, the remote user device 12(d) also provides an arrangement whereby a workflow flow chart can be set up and modified. The workflow flow chart, in turn, relates to topics and sections of respective ones of the information works 40w. In the illustrative arrangement in which the system 10 is used in medical applications, a workflow flow chart may represent, for example, a series of factors to be examined in connection with making a diagnosis of a disease or other condition, possible therapies and the like. Each of the factors to be examined in the workflow flow chart may be linked to a topic 46t or section 47s of an information work 40w that describes the respective factor. Similarly, each of the possible therapies may be linked to a topic 46t or section 47s of an information work 40w that describes the respective therapy. As another example, a workflow flow chart may represent guidelines that are to be followed. In any case, the illustrative workflow flow chart 70 includes a plurality of flow chart nodes generally identified by reference numeral 71f interconnected in a tree pattern by links generally identified by reference numeral 72f. One node, namely, node 71A is a root node, which operates as an entry point for the workflow flow chart 70.

The nodes 71f comprising the workflow flow chart 70 may comprise any of a number of types of nodes, including, for example, query nodes, user input nodes, information nodes, and so forth. A query node can prompt a user to obtain information of a particular type from a patient, for example, his or her temperature, blood pressure, or the like. A user input node can receive input from the user, as input through the user input 22(d) (FIG. 1), and perform processing on the input. For example, if a query node prompts the user to obtain the patient's temperature, the query node can have, as one or more child nodes, respective user input node(s) that determine whether input from the user indicates that the patient's temperature is within a particular one of a like number of non-overlapping temperature ranges. If a user input node determines that the patient's temperature is within its associated range, flow through the flow chart proceeds through that node to its child node(s). The children of the user input node may comprise any of a plurality of types of nodes, including a query node, an information node or any of a plurality of other types of nodes. If the user input node has a query node as a child, the user may input more information for use by that node's children. If the user input node has an information node as a child, the information node may, for example provide a diagnosis, suggest a therapy, or provide any other type or types of information that might be of interest to the user.

Nodes of the user input type may perform a number of types of processing operations in connection with the user input provided thereto, including, for example, simple comparisons with a numerical value or range of values, text matching, and complex numerical processing, and may make use of various programs such as those that provide "permeable content" as described in the Shah patent.

The remote user device 12(d) may make use of multiple workflow flow charts. Various workflow flow charts may be provided as part of the information that the base station 11 provides to the respective remote user devices 12(d). Alternatively or in addition, the user can enable the remote user device 12(d) to, during a training phase, generate a workflow flow chart. During the training phase, the user can input information to the remote user device 12(d) as to the particular queries that are involved with making diagnoses, the order in which the queries are to be performed, the relevant user inputs and processing operations to be performed in connection with the user inputs, and information to be displayed. Using this information, the remote user device 12(d) can generate the workflow flow chart.

In addition, a workflow flow chart 70 may link to other workflow flow charts. For example, the remote user device 12(d) may be provided with a workflow flow chart related to an advisory or guidelines from the U. S. Food and Drug Administration, to which other workflow flow charts may link. As another example, an medical insurance company may have a policy regarding pharmaceuticals that may be prescribed, numbers per prescription, and the like, which may be reflected in a workflow flow chart, to which other workflow flow charts may link.

In addition, the remote user device 12(d) also allows a user to edit a previously-created flow chart. In that operation, the user can add to a workflow flow chart, edit queries associated with query nodes, modify the processing operations that are to be performed by user input nodes and modify the information to be displayed by an information node. In addition, the user can modify a link 72f that links two nodes such that it links to another node.

Figure 4:
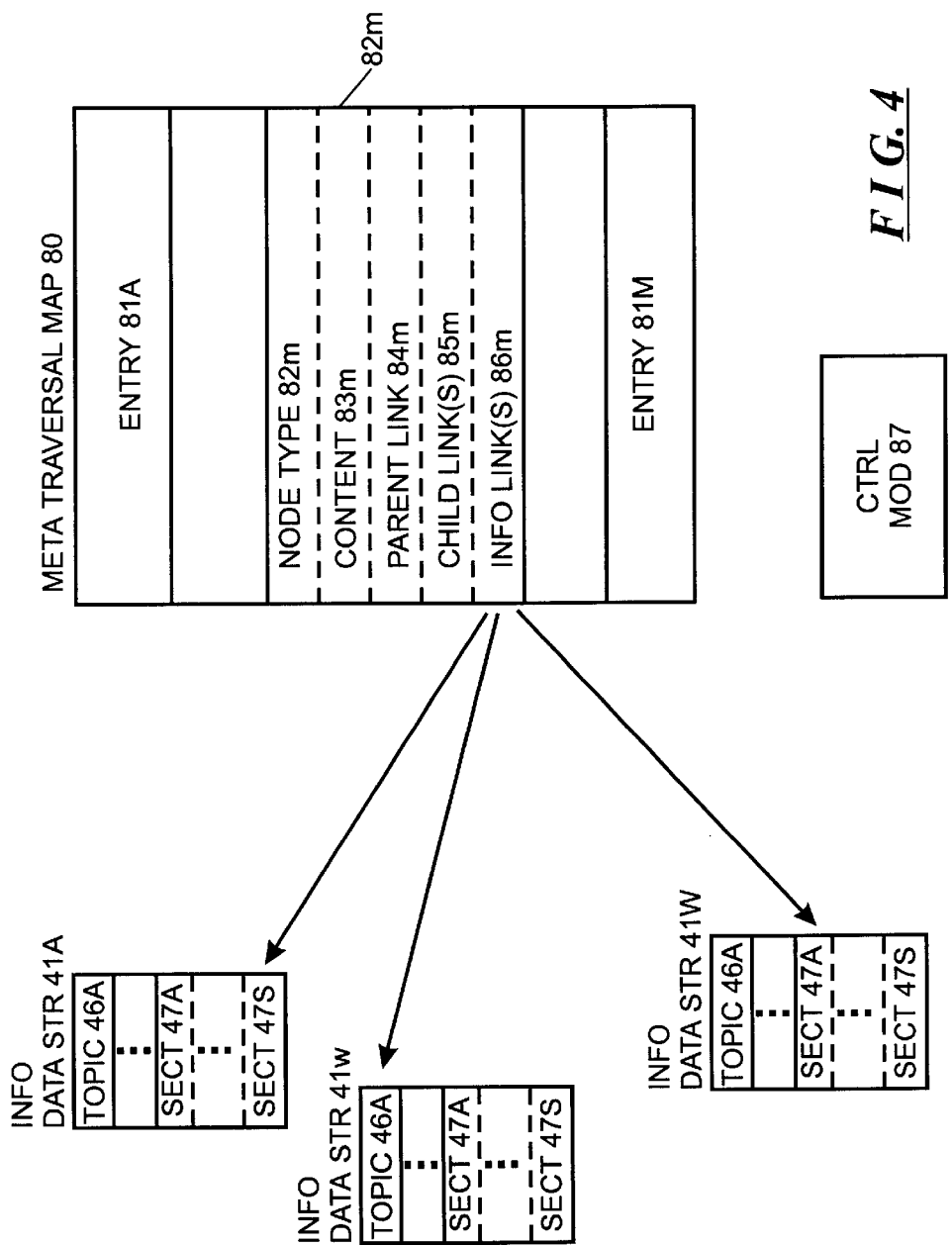
FIG. 4 depicts a functional block diagram of a portion of a portion of the information supply and update system depicted in FIG. 1 for providing a workflow flow chart subsystem, in accordance with a second aspect of the invention.

FIG. 4 depicts a functional block diagram of a portion of the remote user device 12(d) relating to this aspect of the invention. With reference to FIG. 4, the workflow flow chart is defined by a meta traversal map 80 that includes a plurality of entries 81A through 81M (generally identified by reference numeral 81m). Each entry 81m is associated with a node 72f of the workflow flow chart 70. The node 70A that forms the root of the workflow flow chart 70 may be associated with any of the entries 81m. If the root node is not associated with the first entry 81A of the meta traversal map 80, a pointer (not shown) may also be provided to the entry 81m that is associated with the root node 70A. Each entry 81m includes a plurality of fields that define the structure of the workflow flow chart 70, including a type field 82m, a content field 83m, a parent link field 84m, a child links field 85m, and an information link field 86m. The type field 82m contains node type information that identifies the type of node that is associated with the respective entry 81m, in particular indicating whether the node is a node of the query node type, a user input type or an information display type. The content field 83m that specifies the content for the respective node 71f. If the node is of the query node type, the content field 83m contains the content for the query. Alternatively, the content field 83m of an entry may contain one or more pointers to the content for the query, which may be useful if, for example, the query is or includes graphical information, is stored on another device such as the base station 11 or the like. If the query is stored on another device, the remote user device 12(d) may enable the query to be downloaded to it when it is to display the node on the display canvas 25.

The links fields 84m, 85m and 86m essentially define the structure of the workflow flow chart 70. If the node associated with an entry 81m has a parent node, the parent link field 84m will contain a pointer to the entry that is associated with the parent node. It will be appreciated that, if the field is associated with the root node 71A in the workflow flow chart 70 (FIG. 3), which node does not have a parent node, the parent link field 84m will be empty. Similarly, if the node associated with an entry 81m has one or more child nodes, the child link field 85m will have a corresponding number of pointers to entries in the meta traversal map not have a chart that identifies the entry of the meta traversal map 80 that is associated with the node's parent, a child links field 85m that identifies the entry or entries of the meta traversal map that are associated with the child or children of the node associated with the entry 81m.

The information link field 86m can contain one or more pointers to respective portions of the information works 40w that contain information that is related to the subject matter of the node that is associated with the entry 81 m. Each pointer may point to a respective section 47s or topic 46t in an information work. For example, in the illustrative embodiment in which the system 10 provides medical information to medical professionals, and if the node is a node of the query type, the information link field 86m may contain pointers to sections 47s or topics 46t for which the query is relevant to a diagnosis. Alternatively, if the node is a node of the user input type, in which a processing operation is performed in connection with input provided by a user, the information link field 86m may contain pointers to sections 47s or topics 46t that contain information relating to the processing operation that is to be performed. Similarly, if the node with which the entry 81m is associated is a node of the information type, the information link field 86m may contain pointers to sections 87s or topics that contain background for the information to be displayed for the node.

The remote user device 12(d) also makes use of a workflow flow chart control module 90 in connection with this aspect of the invention. The workflow flow chart control module 90 controls the operations of the remote user device 12(d) in connection with the creation and use of the workflow flow charts that are provide to the remote user device 12(d) or that are generated by the remote user device 12(d) as described above. A user may initiate use of a workflow flow chart in any of a number of ways. For example, the user can initiate use of a workflow flow chart that is associated with, for example, the section or topic that is currently being displayed, by actuating one or more of the control buttons 27. If the section or topic is associated with one workflow flow chart, the workflow flow chart control module 90 can enable that workflow flow chart to be displayed. On the other hand, if the section or topic is associated with more than one workflow flow chart, the workflow flow chart control module 90 can enable a list of workflow flow charts that are associated with the section or topic to be displayed and allow the user to select one, after which the workflow flow chart control module can enable the selected workflow flow chart to be displayed. As a further alternative, a workflow flow chart can be associated with one or more particular words or other indicia contained in a section or topic, which indicia can serve as a control button. That is, the user can initiate use of a workflow flow chart by actuating the indicia, after which the workflow flow chart control module 90 can enable the workflow flow chart that is associated with the indicia to be displayed. Similarly, if the indicia is associated with a plurality of workflow flow charts, the workflow flow chart control module 90 can When a user initiates use of a workflow flow chart, the remote user device 12(d) uses the information in the entry 81m that is associated with the root node to display the root node of the selected workflow flow chart in the display canvas. If the node is a query node, the user can provide input using the user input 22(d) (FIG. 1). The control module 87 will receive the user input and process the root node's child user input node(s) to determine the path to be traversed through the workflow flow chart. In that operation, the control module 87 will use the entry or entries associated with the user input node(s), as pointed to by the pointer(s) in the child link(s) field 85m of the entry 81m associated with the root node, to determine the processing operation(s) to be performed in connection with the respective user input node(s).

After the control module 87 has completed the processing operations, it will determine the path through the appropriate user input node to that node's child, which may be either another query node or an information node. As with the root node, the control module 87 can identify the entry 81m associated with the user input node's child node using the child link(s) field 85*m* of the entry 81 associated with the user input node. If the child node is an query node, the control module 87 can repeat the operations described above. On the other hand, if the child node is an information node, the control module 87 can obtain the information and display it on the display canvas 25. As noted above, the entry 81*m* associated with the information node may contain the information in the content field 83*m*, in which case the control module 87 can retrieve the information from the content field 83*m*. On the other hand, if the content field 83*m* contains a pointer to another location in which the information is stored, the control module 87 can use the pointer to obtain the information from the other location. The user can actuate a control button 27 to enable the control module 87 to proceed to the next node in the workflow flow chart, if any.

As noted above, an entry 81*m* associated with a node may also, in the information link(s) field 86*m*, contain one or more pointers, each to a respective section 47*s* or topic 46*t* of an information work 41*w*. If the user actuates a respective one of the control buttons 27, the control module 87 can enable a list of sections 47*s* or topics 46*t* associated with the respective pointers that are contained in the information link(s) field 86*m* to be displayed in the display canvas 25, in a manner similar to the display of a list of cross-references associated with a section 47*s* or topic 46*t* as described above. If the user selects an item from the list, the control module 87 can enable the information from the section 47*s* or topic 46 to be displayed in the display canvas 25. The user can enable the control module 87 to return to the workflow flow chart by actuating an appropriate one of control buttons 27.

As also described above, a user can use the remote user device 12(*d*) to generate or edit a workflow flow chart. In that operation, the user provides input through the user input 22(*d*) (FIG. 1). The input provided by the user is used by the control module 87 to generate or edit the workflow flow chart. In editing a workflow flow chart, portions of a flow chart can be added or deleted, content associated with nodes can be modified, a link between a child node and its parent node can be modified so that the child node will become a parent of another node. In modifying a link between a child node and a parent node, so that the child node is a child of another node, the control module 87 can delete the pointer to the child node from the child link(s) field 85*m* of the entry 81*m* associated with the current parent, add a pointer to the child node to the child link(s) field of the entry that is associated with the other node, and modify the pointer in the parent link field 84(*m*) of the entry that is associated with the child node to point to the entry associated with the other node.

In modifying content that is associated with a node, the control module 87 can modify the contents of the content field 83*m*. If the content field 83*m* contains a pointer to another location that actually contains the contents, the content field 83*m* can be modified to point to another location that contains the content as modified, or the control module 87 can enable the updated content to be stored in the location pointed to by the pointer in the content field 83*m*.

In deleting a portion of a workflow flow chart, the user can enable the control module 87 to essentially remove the link between the node that is the upper-most node of the portion to be removed and its parent node. This can be accomplished by removing the pointer to the upper-most node from the child link(s) field 85*m* of the parent node. If the parent node is to be linked to another node, which may include, for example, a grandchild, great grandchild, etc., of the current child, as a child node, the control module 87 can store a pointer thereto in the child link(s) field 85*m* of the entry 81*m* associated with the parent node, and a pointer to the parent node in the parent link field 84(*m*) of the new child node. The control module 87 can also delete the entry or entries associated with the node or nodes that were deleted, but it will be appreciated that it is not necessary to do so.

Operations performed in adding a portion of a workflow flow chart and creating a new workflow flow chart are generally similar. In both, the control module 87 will create entries 81*m* associated with the respective nodes that are to be created and store the information, as provided by the user, in the respective fields 82*m* through 86*m*. In the case of adding a portion of a workflow flow chart, the control module will add entries 81*m* to an existing meta traversal map 80, and in the case of creating a new workflow flow chart, the control module 87 will generate a new meta traversal map 80.

The invention provides a number of advantages. In the case of the reverse cross-reference subsystem, the invention provides an arrangement by which the remote user device 12(*d*) can monitor cross-reference usage and enable applications to be used based both on the cross-reference source and the cross-reference source. In the case of the workflow flow chart subsystem, the invention provides an arrangement that can be used in assisting workflow.

It will be appreciated that numerous modifications may be made to the system 10. For example, although the system 10 has been described as being for use in connection with a medical application, it will be appreciated that the system may be used in connection with other applications.

In addition, although the remote user device has been described as having section selection buttons 26 and control buttons 27 displayed along respective sides of the display canvas 25, it will be appreciated that the buttons 26 and 27 can be displayed anywhere on the display canvas 25. In addition, the user may select where on the display canvas 25 the various buttons will be displayed.

Furthermore, although the remote user devices 12(*d*) have been described as being PDA's (personal digital assistants), paging devices, cellular telephones, smart phones, and so forth, it will be appreciated that numerous other types of devices may be used, including, but not limited to personal computers, tablets, and any other types of devices which may receive information from a remote location and store the information for later processing display.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An information handling system comprising
   A. a plurality of information works, at least one information work including information and a work control module configured to facilitate accessing the information, at least one other information work including at least information, the work control module being further configured to establish at least one cross-reference between the at least one information work and the other information work;
   B. at least one application; and
   C. a reverse cross-reference control subsystem configured to, in response to a user initiating use of the at least one cross-reference, determine whether the at least one cross-reference is associated with the at least one application, and, if so, initiate processing of the at least one application.

2. An information handling system as defined in claim 1 further comprising:
   A. a cross-reference establishment module configured to establish said at least one cross-reference; and
   B. an application association module configured to generate application association information in response to the establishment by the cross-reference establishment module of said at least one cross-reference for use by the reverse cross-reference control subsystem.

3. An information handling system as defined in claim 2 in which the cross-reference establishment module is configured to use information provided by the user in connection with establishing the at least one cross-reference.

4. An information handling system as defined in claim 2 in which the cross-reference establishment module is configured to use information provided by the at least one information work control module in connection with establishing the at least one cross-reference.

5. An information handling system as defined in claim 1 in which the at least one application is configured to provide call information to the reverse cross-reference control subsystem, the reverse cross-reference control subsystem being configured to use the call information in determining whether the at least one cross-reference is associated with the at least one application.

6. An information handling system as defined in claim 1 in which the reverse cross-reference control module comprises:
   A. a context library identifying, if the at least one application is associated with the cross-reference identified in the cross-reference register, the at least one application associated therewith; and
   C. a cross-reference control subsystem control module configured to, in response to the user initiating use of the cross-reference associated with the entry, initiate processing of the application associated therewith as identified by the context library.

7. An information handling system as defined in claim 6 in which the reverse cross-reference control module further comprises a cross-reference register comprising at least one entry associated with the cross-reference, the entry providing source information identifying the information work for which the cross-reference was created and target information identifying the other information work, the cross-reference control subsystem control module being further configured to use the information in the cross-reference register and information provided by the at least one application to determine whether the at least one application is to be associated with the respective cross-reference and, if so, provide information thereto to the context library.

8. An information handling method for use in connection with an information handling system comprising a plurality of information works, at least one information work including information and a work control module configured to facilitate accessing the information, at least one other information work including at least information, the work control module being further configured to establish at least one cross-reference between the at least one information work and the other information work, and at least one application, the method comprising the steps of:
   A. in response to a user initiating use of the at least one cross-reference, determining whether the at least one cross-reference is associated with the at least one application, and
   B. in response to a positive determination, initiating processing of the at least one application.

9. An information handling method as defined in claim 8 further comprising the steps of:
   A. establishing said at least one cross-reference; and
   B. generating application association information in response to the establishment of said at least one cross-reference.

10. An information handling method as defined in claim 9 in which the cross-reference establishment step includes the step of using information provided by the user in connection with establishing the at least one cross-reference.

11. An information handling method as defined in claim 9 in which the cross-reference establishment step includes the step of using information provided by the at least one information work control module in connection with establishing the at least one cross-reference.

12. An information handling method as defined in claim 8 in which the at least one application is configured to provide call information to the reverse cross-reference control subsystem, the association determination step including the step of using the call information in determining whether the at least one cross-reference is associated with the at least one application.

13. A computer program product for use in connection with a computer to provide an information handling system, the computer further providing a plurality of information works, at least one information work including information and a work control module configured to facilitate accessing the information, at least one other information work including at least information, the work control module being further configured to establish at least one cross-reference between the at least one information work and the other information work and at least one application, the computer program product comprising a computer readable medium having encoded thereon:
   A. a cross-reference association determination module configured to enable the computer to determine, in response to a user initiating use of the at least one cross-reference, whether the at least one cross-reference is associated with the at least one application,
   B. an application processing initiation module configured to enable the computer to, in response to a positive determination, initiate processing of the at least one application.

14. A computer program product as defined in claim 13 in which the cross-reference association determination module includes:

A. a context library module configured to enable the computer to establish a context library for identifying, if the at least one application is associated with the cross-reference identified in the cross-reference register, the at least one application associated therewith; and C. a cross-reference control subsystem control module configured to enable the computer to, in response to the user initiating use of the cross-reference associated with the entry, use the contents of the context library to determine whether the at least one application is associated with the cross-reference.

15. A computer program product as defined in claim 14 further including a cross-reference register module configured to enable the computer to establish a cross-reference register comprising at least one entry associated with the cross-reference, the entry providing source information identifying the information work for which the cross-reference was created and target information identifying the other information work, the cross-reference control subsystem control module being further configured to enable the computer to use the information in the cross-reference register and information provided by the at least one application to determine whether the at least one application is to be associated with the respective cross-reference and, if so, provide information thereto to the context library.

\* \* \* \* \*